United States Patent
Buchele et al.

(10) Patent No.: US 6,920,966 B2
(45) Date of Patent: Jul. 26, 2005

(54) REMOTELY RELEASABLE SUPPORT STRUT

(75) Inventors: Paul D. Buchele, Glendale, AZ (US); Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 112 days.

(21) Appl. No.: 10/396,024

(22) Filed: Mar. 24, 2003

(65) Prior Publication Data

US 2004/0231933 A1 Nov. 25, 2004

(51) Int. Cl.[7] ................................................. F16F 9/32
(52) U.S. Cl. .................. 188/300; 188/268; 267/140.14; 244/205 SL
(58) Field of Search .................. 267/140.11, 140.13, 267/140.14, 140.15; 188/266, 267, 267.1, 267.2, 266.1, 266.2, 266.7, 268, 274, 300; 244/161, 205, 100 R

(56) References Cited

U.S. PATENT DOCUMENTS

| | | | |
|---|---|---|---|
| 4,929,135 A | * 5/1990 | Delarue et al. | 411/354 |
| 5,060,888 A | 10/1991 | Vezain et al. | |
| 5,070,697 A | * 12/1991 | Van Zeggeren | 60/527 |
| 5,160,233 A | * 11/1992 | McKinnis Darin N. | 411/433 |
| 5,248,233 A | 9/1993 | Webster | |
| 5,366,198 A | * 11/1994 | Dickinson | 248/550 |
| 5,771,742 A | * 6/1998 | Bokaie et al. | 74/2 |
| 6,126,371 A | 10/2000 | McCloskey | |
| 6,354,576 B1 | * 3/2002 | Jacobs et al. | 267/140.14 |
| 6,499,700 B1 | 12/2002 | Schlosser et al. | |
| 6,508,437 B1 | 1/2003 | Davis et al. | |
| 2003/0089195 A1 | * 5/2003 | Neubauer et al. | 74/640 |

FOREIGN PATENT DOCUMENTS

| | | |
|---|---|---|
| FR | 2614951 A | 11/1988 |
| JP | 01105035 | * 4/1989 |
| WO | WO 03/058091 A | 7/2003 |

* cited by examiner

Primary Examiner—Robert A. Siconolfi
Assistant Examiner—Devon Kramer

(57) ABSTRACT

Methods and apparatus are provided for locking and releasing ends of a support strut coupled between a mounting platform and a load. In a preferred embodiment, the strut comprises a damping section coupled between the ends and having a gap therein when the strut is unlocked, a locking section coupled between the ends for closing the gap by applying stress to a portion of the damper section through a force transmitting member, and a releasing section coupled in parallel with part of the force transmitting member, the releasing section including a Shape Memory Alloy (SMA) and heater therefore. Heating the SMA relieves the stress and opens the gap. Release from the locked condition occurs gradually and without fracture or sudden shock and the heater can be actuated remotely. In a preferred embodiment, a worm drive turnbuckle arrangement is used to apply force to lock the strut.

15 Claims, 8 Drawing Sheets

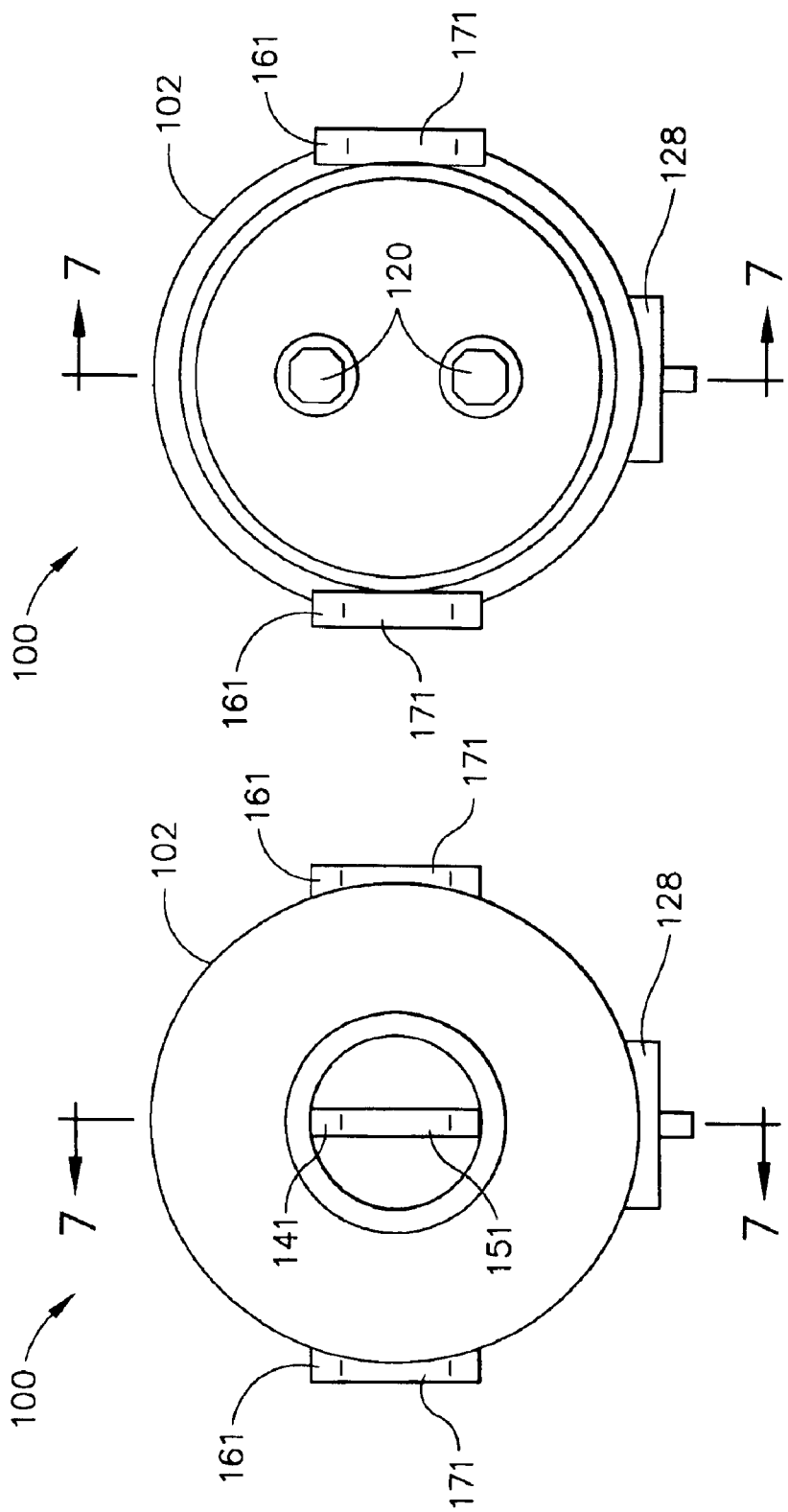

REMOTELY RELEASABLE SUPPORT STRUT

FIELD OF THE INVENTION

The present invention generally relates to equipment support struts that can be locked and released manually or remotely, and more particularly, supports struts useable in connection with remotely deployable systems.

BACKGROUND OF THE INVENTION

Many electronic, optical and mechanical systems that are fragile but which must be moved require support struts capable of being locked during movement of the system and released when the system is in place so that associated anti-vibration and other isolation elements are free to protect the system from subsequent mechanical stress. The problem of providing such a lockable and releasable strut is particularly difficult when the system is remotely deployable, as for example, when used in spacecraft. During launch of spacecraft deployable systems, the payload can be subjected to large mechanical forces and must be restrained to avoid damage. However, once the payload is in orbit it is no longer human accessible. Thus, conventional man-releasable struts cannot be used.

In the prior art, it has been common to overcome this lack of access by using remotely triggered release mechanisms such as explosive bolts or the like that fracture or deform parts of the support structure to cause release. While such mechanisms can be fired remotely by radio or computer command and are effective in releasing a pre-loaded (locked) support strut, they can impart significant shock to the payload when activated, thereby increasing the risk of harm to a fragile system. A further limitation of such prior art approaches is that they are often difficult or impossible to test prior to launch, that is, alternatively placed in a locked or released condition.

Accordingly, a need continues to exist for supports that can be locked and released manually or remotely, and especially for supports useable in connection with remotely deployable systems. In addition, it is desirable to provide a support structure that can be locked and released multiple times for test purposes. It is further desirable that remote release of the support be accomplished without significant shock to the support or its payload so that damage to fragile components of the system being supported is avoided. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for locking and releasing ends of a support strut coupled between a mounting platform and a load. In a preferred embodiment, the strut comprises a damping section coupled between the ends and having a gap therein when the strut is unlocked, a locking section coupled between the ends for closing the gap by applying stress to a portion of the damper section through a force transmitting member, and a releasing section coupled in parallel with part of the force transmitting member, the releasing section including a Shape Memory Alloy (SMA) and heater therefore. Heating the SMA relieves the stress and opens the gap. Release from the locked condition occurs gradually and without fracture or sudden shock and the heater can be actuated remotely.

A method is provided for locking and releasing ends of a support strut coupled between a mounting platform and a load and having the above-noted elements. The method comprises applying a force to the damper section using the locking section to lock the strut and heating the shape memory alloy to relieve the force applied to the damper section, thereby releasing the strut. In a preferred embodiment, the force is applied using a worm drive turnbuckle arrangement. Heating can be remotely actuated.

BRIEF DESCRIPTION OF THE DRAWINGS

The present invention will hereinafter be described in conjunction with the following drawing figures, wherein like numerals denote like elements.

FIG. 5 is a left end view of the support strut of FIG. 4;

FIG. 6 is a right end view of the support strut of FIG. 4;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

While the present invention is described by way of a support structure or strut that is particularly adapted for use in connection with spacecraft deployable systems, those of skill in the art will understand that this is merely for convenience of explanation and not intended to be limiting, and that the present invention is useful and applicable to terrestrial (land and marine) and aircraft based systems as well as space based systems.

Figure 1:
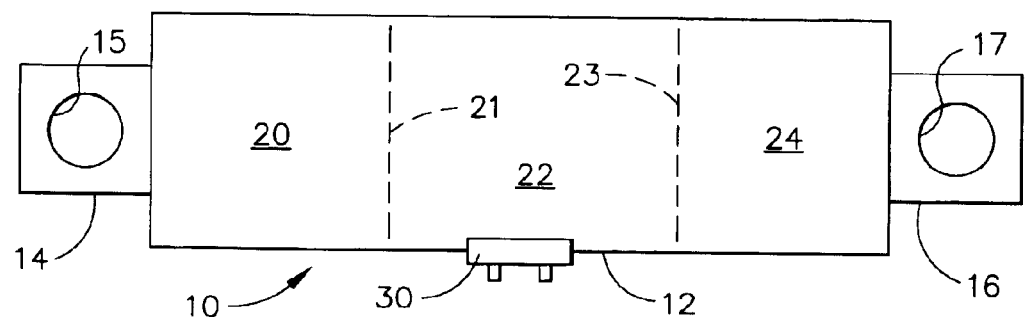
FIG. 1 is a simplified conceptual side view of a remotely releasable support strut according to the present invention.
Figure 2:
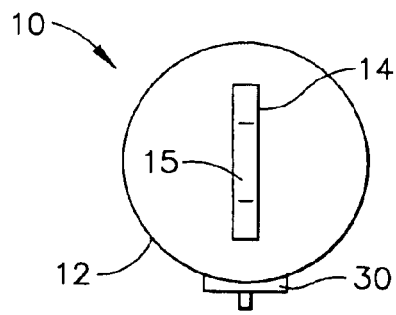
FIG. 2 is a left end view of the support strut of FIG. 1.
Figure 3:
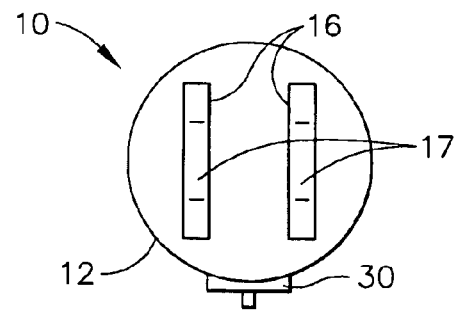
FIG. 3 is a right end view of the support strut of FIG. 1.

FIG. 1 is a simplified conceptual side view of remotely releasable support strut 10 according to the present invention. FIG. 2 is a left side end view of the support strut of FIG. 1. FIG. 3 is a right side end view of the support strut of FIG. 1. Support strut 10 has enclosure or body 12, first attachment means or portion 14 and second attachment means or portion 16, respectively at distal ends of body 12. Body 12 is shown in highly simplified form and, as will be further explained, one or both of attachment means 14, 16 are intended to couple to internal supports within body 12 and not merely externally to body 12. Attachment portion 14 conveniently has hole 15 therein and attachment portion 16 conveniently has hole 17 therein to permit coupling of strut 10 to an external support (not shown) at one end and to a load (not shown) at the other end. While attachment portions 14, 16 are shown as made up of a stud or shackle with one or more connection holes therein for attachment to the external support and load, this is merely for convenience of explanation and not intended to be limiting. Those of skill in the art will understand that any type of connecting arrangement may be used and that the present invention is not limited by the type of connection used, the nature of the connecting portions being used or the support or load to which the strut is attached.

As indicated by dashed lines 21, 23, strut 10 conveniently has at least three functions therein; damper function 20, release function 22 and locking function 24. While these functions are illustrated in FIG. 1 as being arranged in series, this is merely for convenience of explanation and is not essential. One or more of these functions may conveniently be integrated in whole or part with other function(s). What is important is that strut 10 provide at least these three functions 20, 22, 24.

Strut 10 is intended to be coupled between a support (not shown) and a load (not shown) via coupling or attachment portions 14, 16. Its function is to support the load used under a variety of conditions. For example:

First, strut 10 should act as a substantially rigid support while the load is being moved. This condition is referred to as being "locked." Accordingly, as used herein the words "lock" and "locked" are intended to mean a strut has been placed in a condition in which it is substantially rigid as far as the forces it is intended to withstand are concerned. For example, when strut 10 is used with a spacecraft deployable load, it must resist the inertial forces generated during the launch phase and any subsequent positioning rocket burns. The forces encountered during such activities can be quite high, many times the earth weight of the payload. For example, it is not unusual to require a support strut to withstand a 25,000-pound inertial force during launch of a spacecraft deployable load. Thus, the locked condition of the strut must be robust and capable of supporting large inertial forces. While this aspect is particularly important for space deployed systems, the same considerations apply equally well for earth-bound or marine applications where large inertial forces can be generated whenever sensitive equipment is being moved. The purpose of locking function 24 is to place strut 10 in a locked condition.

Second, strut 10 should desirably act to some degree as a flexible coupling between support and load after the primary movement of the load has been completed, for example, after a spacecraft deployable load has been placed in orbit. This is a purpose of damper function 22. As used herein the words "damp", "damping", "damper" or "damper function" are intended to refer generally to any arrangement for providing a flexible coupling between attachment portions 14, 16 so that some relative motion thereof is possible. It is desirable that damper function 22 also include some means of cushioning the relative motion to absorb and/or dissipate mechanical energy so that the amount transmitted to or from the load is reduced, that is, so that there is provided some mechanical isolation between support and load. Any and all of these functions are intended to be included in damper function 20. When strut 10 is in a condition where damper function 22 is operative, it is referred to as being "free."

Third, a feature of strut 10 is that it provide remote release of the locking mechanism, that is, be capable of changing from the locked to the free condition without human intervention. Hence, strut 10 desirably contains remote release function 22. The purpose of remote release function 22 is to unlock the strut after primary movement has been completed so as to place it in a "free" condition where damper function 20 is operative. A further feature of the present invention is that release function 22 is 'soft', that is, that it occurs gradually and is not accompanied by any sudden shock, explosions or breakage of internal supports. Electrical plug 30 is provided in body 12 of strut 10 so that remote release function 22 may be electrically activated.

Figure 4:
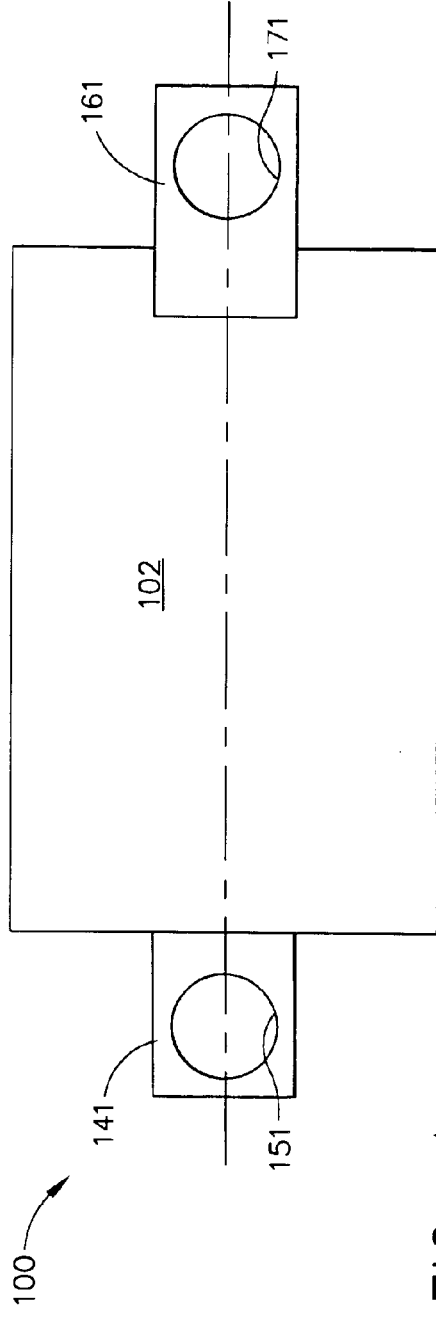
FIG. 4 is a simplified side view of a remotely releasable support strut according to the present invention showing further details.
Figure 7:
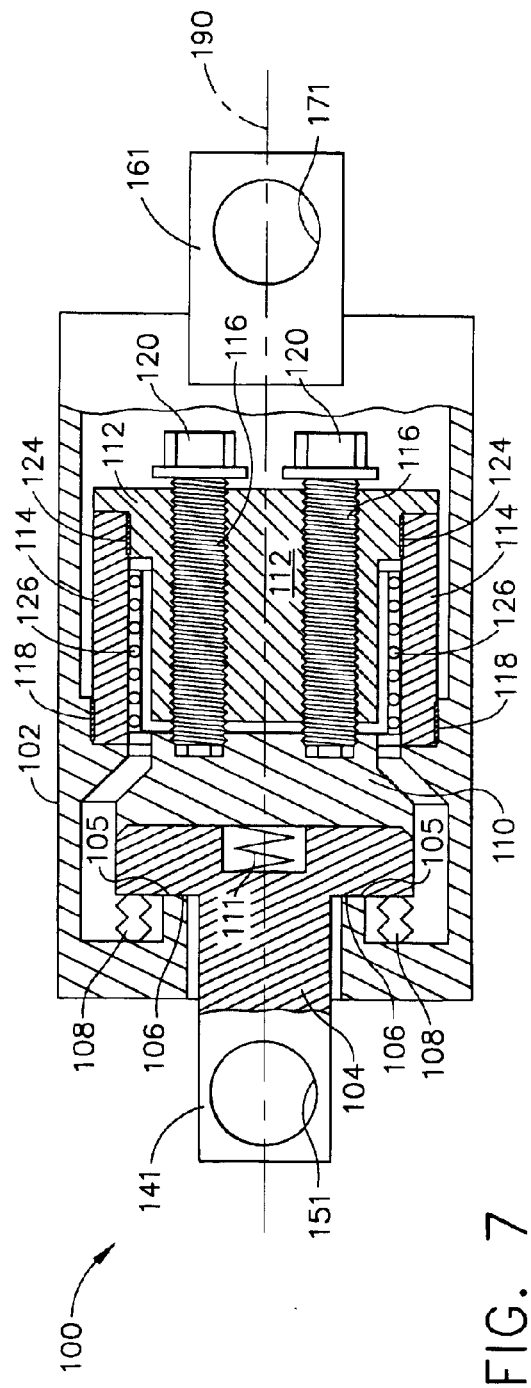
FIG. 7 is a simplified partial cross-sectional view of the support strut of FIGS. 4–6 showing interior details with the strut in a locked condition.
Figure 8:
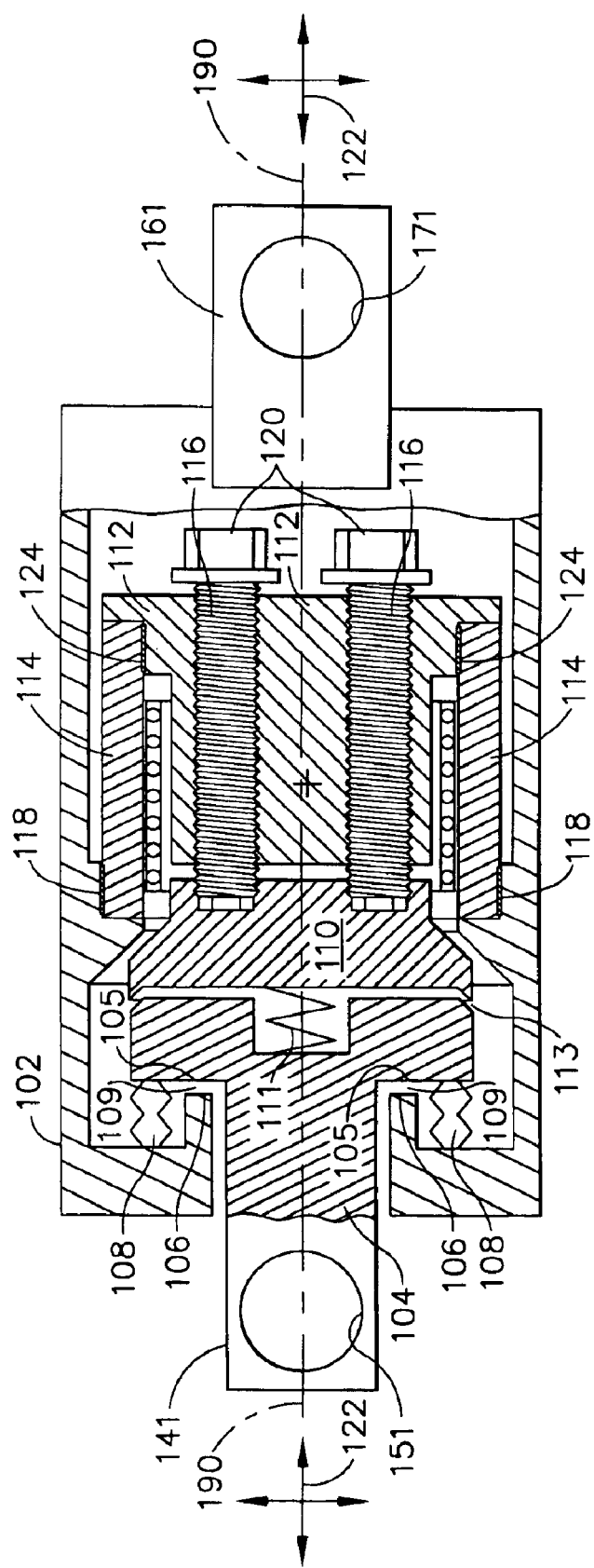
FIG. 8 is a simplified partial cross-sectional view similar to FIG. 7 but with the strut of FIGS. 4–6 in a released condition.

FIG. 4 is a side view, FIG. 5 is a left end view, and FIG. 6 is a right end view of support structure or strut 100, similar to strut 10, showing further details. Strut 100 has body 102 analogous to body 12 of FIG. 1, and attachment portions 141, 161 with coupling holes 151, 171 analogous to 14, 16 and 15, 17, respectively, of FIG. 1. FIG. 7 is a simplified partial cross-sectional view of support strut 100 of FIGS. 4–6, showing interior details with the strut in a locked condition. FIG. 7 is a view substantially on plane 7—7 indicated in FIGS. 5–6. For simplicity of illustration, locking bolts 120 are shown whole rather than in cross-section in FIGS. 7–8. FIG. 8 is a view similar to FIG. 7 but showing strut 100 in the free condition.

Referring now to FIGS. 7–8, attachment portion 161 is part of or attached to body 102 and attachment portion 141 is part of or attached to internal damper strut ("D-strut") 104. In the locked condition, surface 105 of D-strut 104 rests against surface 106 of body 102. In the free condition, surfaces 105, 106 are spaced apart by gap 109 and D-strut 104 is coupled to body 102 by resilient member 108. Resilient member 108 is usefully a spring or bellows or elastomeric cushioning material or a combination thereof. Such materials are well known in the art. In combination with D-strut 104 and body 102, resilient member 108 provides damper function 20.

In the free condition (see FIG. 8) gap 109 separates D-strut 104 and housing 102, and gap 113 separates D-strut 104 and jack-pad 110. Spring 111 insures that gap 113 remains open until locking screws 120 are activated. Spring 111 is substantially weaker than the spring action of resilient member 108 so gap 109 also remains open in the free condition. In the free condition, D-strut 104 and housing 102 are coupled only by resilient member 108, thus allowing attachment portions 141 and 161 to move with respect to each other as indicated by arrows 122. The range of motion of damping function 20 in strut 100 is determined by the size of gaps 109, 113 and the geometry of the various parts, and may be varied by the designer to suit a particular need.

In strut 100, locking function 24 is provided by the combination of D-strut 104, jack-pad 110, compression block 112, locking screws 120 and expansion material 114. When locking screws 120 are advanced, gap 113 is closed and jack-pad 110 is forced against D-strut 104, which, in turn, is forced against body 102 as gap 109 is closed (see FIG. 7). Locking screws 120 screw into and out of compression block 112 via threads 116. The reaction force created by screws 120 pressing against jack-pad 110 is transmitted to body 102 via expansion material 114. Expansion material 114 is firmly coupled to body 102 by joint 118 and to compression block 112 by joint 124. Joints 118, 124 may be formed by any convenient means, as for example, but not limited to, mechanical threads or brazing or welding or other means having comparatively high shear strength. Any means can be used provided that it has sufficient shear strength to resist the forces generating during pre-loading and release.

Locking screws 120 are advanced to place strut 100 in the locked condition (FIG. 7) and backed off to return strut 100 to the free condition (FIG. 8), as for example, for test purposes. While only two locking screws 120 are shown in FIGS. 6–8, this is merely for convenience of explanation and is not intended to be limiting. The more screws 120, the larger their diameter, the finer their threads and the more robust compression block 112, the greater the stress that strut 100 can withstand in the locked state. Thus, by varying the number and type of locking screws, the properties of strut 100 can be adapted to different loads and different stress conditions associated with launch or other movement.

Remote release function 24 is provided by expansion material 114 and heater 126. Expansion material 114 conveniently has the shape of a hollow cylinder with its longitudinal axis substantially coincident with axis 190 of strut 100. Heater 126 is thermally coupled to expansion material 114, in this example, mounted in intimate contact with the inside wall of the expansion material cylinder. However, heater 126 can equally well be mounted in thermal contact with the outside wall of expansion material 114. Either arrangement is useful. Heater 126 is electrically coupled to external plug 128 (see FIGS. 5–6) whereby electrical current is supplied to energize heater 126. Heater 126 may be energized remotely, that is for example, after a spacecraft deployable system has been launched into orbit or other load placed in an inaccessible location.

Expansion material 114 is conveniently formed of a Shape Memory Alloy (SMA), such as, for example, a TiNi alloy sold by TiNi Aerospace, San Leandro, Calif. under the trade name "Nitinol." Shape Memory Alloys are well known in the art. They have the property, among other things, that when heated to a critical temperature Tc, they undergo a phase transition to another crystalline form with an accompanying large expansion and, for some materials, a large increase in elasticity. This phenomenon can cause the SMA to recover from a mechanically pre-set state (e.g., to elongate) and remain in that condition after the heat is removed.

When locking bolts 120 are tightened to place strut 100 in a locked condition, SMA expansion material 114 is stressed in tension. When heater 126 is energized to raise the temperature of SMA 114 above its transition point, a large strain occurs at constant stress, that is, SMA 114 significantly elongates, thereby moving compression block 112 to the right in FIGS. 7–8, reopening gaps 109, 113. This change in shape is retained after heater 126 is de-energized. Thus, strut 100 is returned to the free condition. The length of SMA 114 (parallel to axis 190) is selected to provide the amount of deformation desired in order to have gaps 109, 113 of an appropriate size for the particular application. The thickness of SMA 114 (perpendicular to axis 190) is selected to withstand the pre-loading force exerted by bolts 120 when strut 100 is placed in the locked condition.

By way of example, and not intended to be limiting, with four locking bolts 120 of ⅜×24 size torqued to ~50 foot-pounds each, a pre-load force of ~25,000 pounds can be placed on strut 100 when locked. That means that strut 100 can withstand a reaction force of ~25,000 pounds during system movement, e.g., launch. SMA 114 of Nitinol having a length of about 7.7 com, an outer diameter of about 6.4 cm and a wall thickness of about 1.5 cm, can increase in length by about 2.3 mm when heated to its phase transition temperature by heater 126. This is sufficient in this particular application to restore gaps 109, 113 substantially to at least their pre-lock, e.g., "free" values of about 1 mm each. Jack-pad 110 is conveniently formed of Nitronic 60, and compression block 112, D-strut 104 and housing 102 are conveniently of Ti, although other materials well known in the art can also be used.

Figure 9:
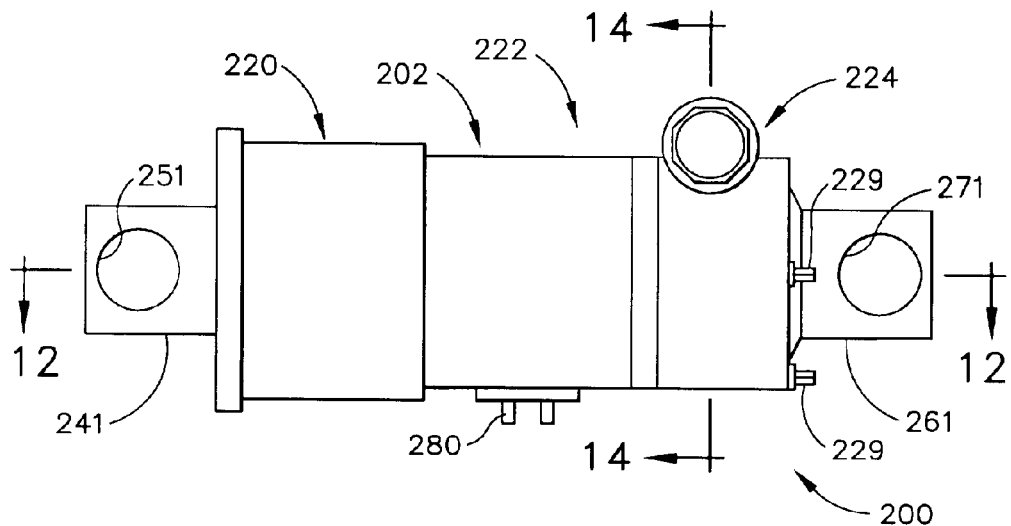
FIG. 9 is a simplified side view of a remotely releasable support strut according to a further embodiment of the present invention.
Figures 10, 11:
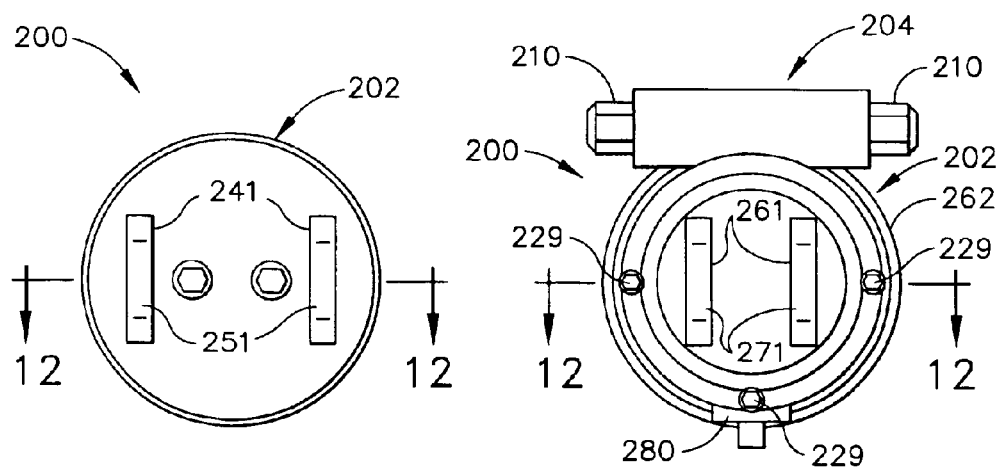
FIG. 10 is a left end view of the support strut of FIG. 9.
FIG. 11 is a right end view of the support strut of FIG. 9.
Figure 12:
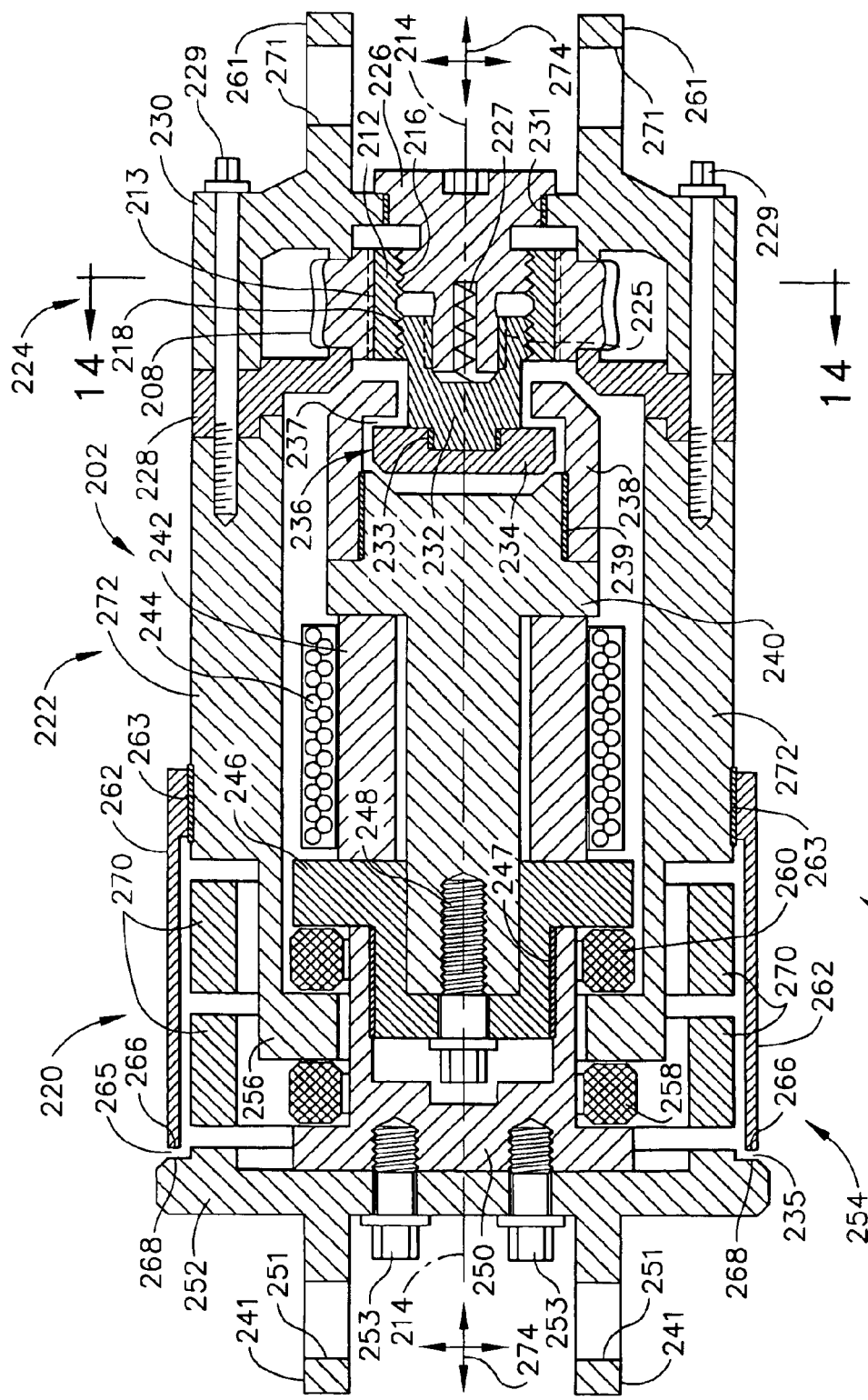
FIG. 12 is a simplified partial cross-sectional view of the support strut of FIGS. 9–11 showing interior details with the strut in a released (free) condition.
Figure 13:
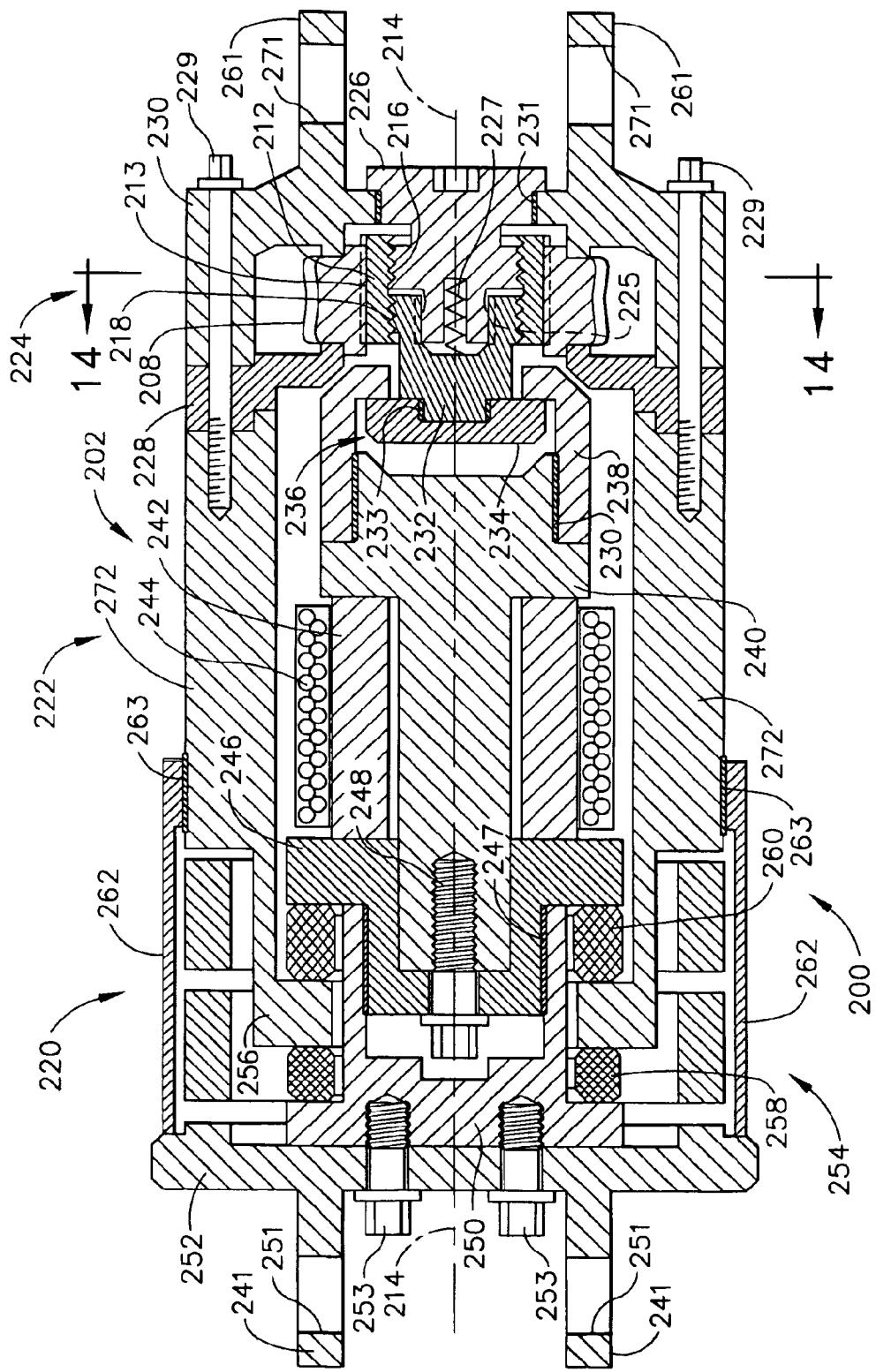
FIG. 13 is a simplified partial cross-sectional view of the support strut of FIG. 12, with the strut in a locked condition.
Figure 14:
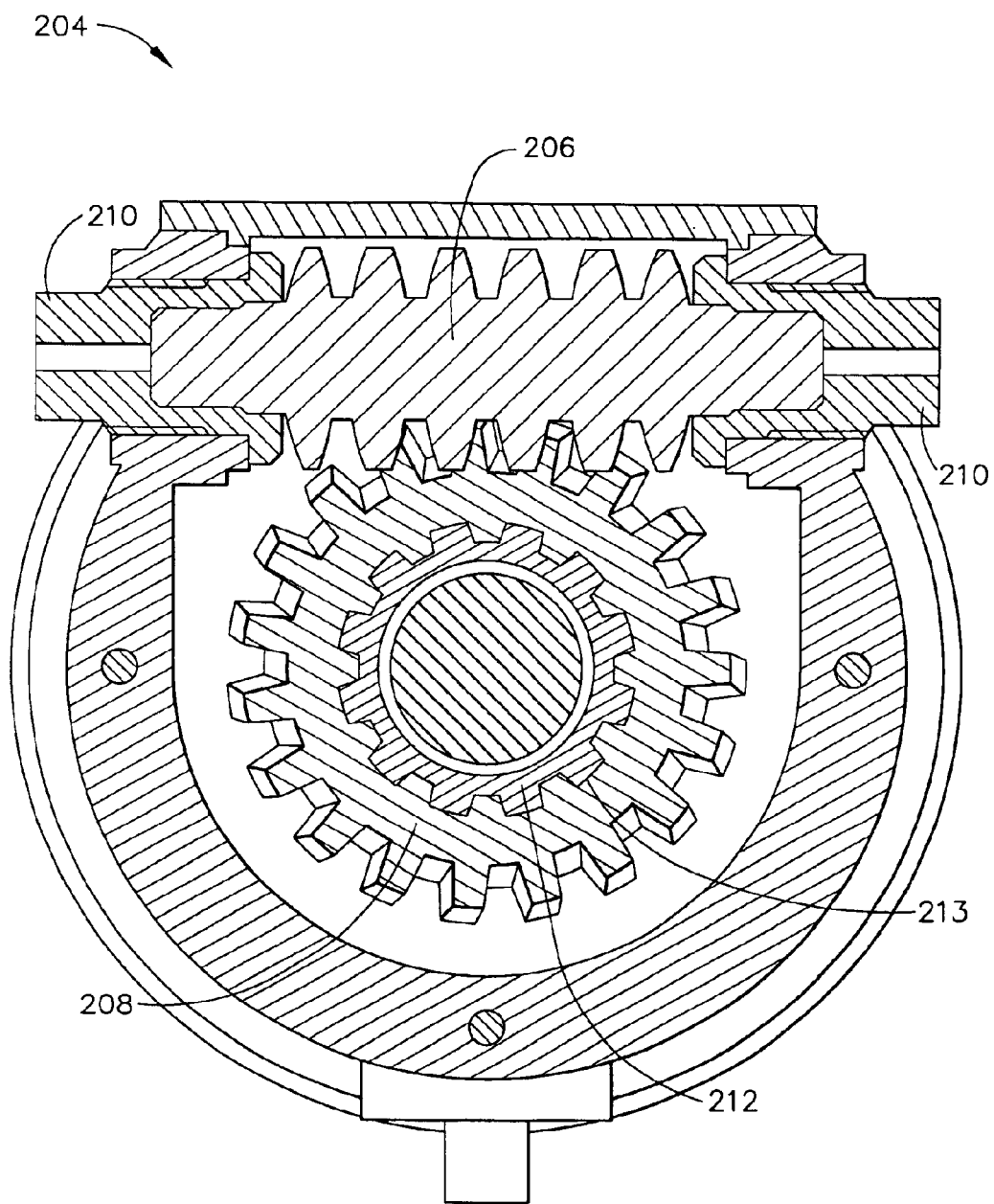
FIG. 14 is a partial cross-sectional view of a portion of the strut of FIGS. 9–13.

FIG. 9 is a side view, FIG. 10 is a left end view, and FIG. 11 is a right end view of support structure or strut 200, similar to strut 10 but according to a further embodiment. Strut 200 has body 202 analogous to body 12 of FIG. 1, and attachment portions 241, 261 with coupling holes 251, 271 analogous to 14, 16 and 15, 17, respectively, of FIG. 1. FIGS. 12, 13 are simplified partial cross-sectional views of support strut 200, analogous to FIGS. 8, 7 respectively, and along plane 12—12 shown in FIGS. 9–11. FIG. 12 shows strut 200 in the free or released condition and FIG. 13 shows strut 200 in the locked condition. For simplicity of illustration, attachment bolts 229, 248, 253 in FIGS. 12–13 are shown whole rather than in cross-section. Attachment portions or regions 241, 261 and respective mounting holes 251, 271 in strut 200 perform the same function as described in connection with struts 10, 100 in FIGS. 1–8. FIG. 14 is a simplified partial cross-sectional view of a portion of support strut 200 of FIGS. 9–13 along plane 14—14 in FIGS. 9, 12–13, showing further details. Support strut 200 has damper function region 220 analogous to function 20, release function region 222 analogous to function 22 and locking mechanism region 224 analogous to function 24 of strut 10 of FIG. 1.

Locking mechanism 224 comprises worm gear pre-loader 204 partially visible in FIGS. 12–14. Worm gear pre-loader 204 includes worm 206 engaging pinion worm gear 208. Pinion worm gear 208 is rotationally held between portions 228 and 230 of body 202. Body portions 228, 230 are conveniently joined to portion 272 of body 202 by bolts 229. Worm 206 has one or more end region(s) 210 to which a torque wrench can be applied. Turning worm 206 causes pinion gear 208 to rotate with a mechanical advantage determined by the number of teeth on pinion gear 208. Located within and axially concentric with pinion gear 208 is sleeve 212 with spline 213 that rotates with pinion 208. Inner portions 216, 218 of splined sleeve 214 are threaded, portion 216 being a right-hand thread and portion 218 being a left-hand thread (or vice-versa). Threaded portion 216 of sleeve 212 engages matching threads on end plug 226 which is fixed to end region 230 of body 202 by attachment means 231. Located within end plug 226 is spring 227 that engages cylindrical plug 232. Cylindrical plug 232 is concentric with and slides over a portion of end plug 226 in a manner that prevents mutual rotation thereof. Spline or polygonal shape 225 is used in the intersecting region of plugs 226, 232 to permit axial sliding (i.e., parallel to axis 214) but prevent rotation of cylindrical plug 232 relative to end plug 226. Threaded portion 218 of sleeve 212 engages matching threads on cylindrical plug 232. Plug 232 has cap 234 fixed thereon by attachment means 233. Taken together, plug 232 and cap 234 are referred to collectively as jack-pad 236.

The combination of pinion gear 208, sleeve 212, end-plug 226 and jack-pad 236 form a turn-buckle. Referring to FIGS. 12–13, as pinion gear 208 rotates, splined sleeve 212 rotates and moves along threads 216 in a direction parallel to axis 214 of strut 200. At the same time as sleeve 212 is moving, for example to the right in FIG. 13, jack-pad 236 moves to the right on threads 218 but by twice the distance which sleeve 212 moves. In the free (released) state, jack-pad 236 and concentric yoke 238 are spaced apart by first gap 237 (see FIG. 12). As worm-gear pre-loader 204 is actuated by rotating worm 206 in the appropriate direction, jack-pad 236 moves to the right closing first gap 237 and engaging yoke 238.

Yoke 238 is fixed on mandrel 240 by attachment means 239. Concentrically surrounding mandrel 240 is expansion material 242 with concentric heater 244, analogous to expansion material and heater 114, 126 of strut 100 in FIGS. 7–8. Mandrel cap 246 is attached to mandrel 240 by bolt 248. The dimensions and arrangement of mandrel 240, expansion material 242, mandrel cap 246 and bolt 248 are chosen so that expansion material 242 is preferably under axially directed compression, but this is not essential. However, it is important that expansion material 242 at least fit snugly between mandrel 240 and mandrel cap 246 in the axial direction. Mandrel cap 246 is coupled to flex mount holder 250 by attachment means 247. Taken collectively, mandrel 240, mandrel cap 246 and flex mount holder 250 comprise D-strut 254. D-strut 254 is coupled to end plate 252 by bolts 253 or other suitable attachment means. Mounting portion 241 is coupled to or a part of end plate 252.

Body 202 has interior portion 256 that is coupled to D-strut 254 by resilient members 258, 260. It is resilient members 258, 260, in conjunction with D-strut 254 and body portion 256, that comprise damping function region 220 for providing damping function 20 in strut 200. In the preferred embodiment, resilient members 258, 260 are annular, fluid-filled bellows springs that are compressible in the direction of axis 214. Such fluid filled bellows springs are desirably coupled by a narrow tube (not shown) to allow fluid to flow from the bellows being axially compressed (e.g., 258 in FIG. 13) into the bellows being axially stretched (e.g., 260 in FIG. 13), but this is not essential. As noted in conjunction with resilient members 105 in FIGS. 7–8, various other arrangements may be used, including but not limited to, rubber and/or plastic materials, springs, or any other arrangement that provides both a spring action and, desirably, viscous action of some kind to dissipate vibrational energy.

Body 202 has skirt portion 262 coupled by attachment means 263 to body portion. 272. In the free state, gap 265 exists between end 266 of skirt 262 and mating surface 268 of end plate 252. End plate 252 is also coupled to body portion 272 by spring 270. Spring 270 conveniently has a rectangular cross-section and extends from end plate 252 to body portion 272. Spring 270 can be machined as a part of end plate 252 and attached to body portion 272 by joining means (not shown). Alternatively, spring 270 can be a separate part joined to end plate 252 and body portion 272 by, for example, welding, brazing, threaded joints, or a combination thereof. The exact method of attachment is not critical and is omitted from FIGS. 12–13 for simplicity. When strut 200 is in the free state, relative motion between attachment means 241, 261 as shown by arrows 274 is constrained and damped by the combination of spring 270 and resilient members 258, 260. As worm gear pre-loader 204 is turned, gap 237 is closed and D-strut 254 is placed in tension. This in turn causes surface 268 of end plate 252 to be pulled into contact with end surface 266 of skirt portion 262 closing gap 265. In the locked state, gaps 237 and 265 are closed and strut 200 forms a substantially rigid entity (see FIG. 13).

Locking mechanism 224 with worm gear pre-loader 204 provides great mechanical advantage and allows a large pre-load force to be placed on strut 200, as for example, more than 25,000 pounds by a single wrench on worm gear ends 210 and with much reduced wrench torque, for example, ~70 foot-pounds. By reversing the direction of worm drive 204, this strut pre-load force may be relieved for testing and then re-applied without damage to strut 200 and without having to change or replace any interior parts thereof.

Remote release is provided in the same manner as for strut 100 except that in this case, expansion material 242 is, in the preferred embodiment, placed in compression during assembly of D-strut 254. This initial compressive pre-load force on expansion material 242 may or may not be overcome by the tension strut pre-loading through locking mechanism 224. In either case, when heater 244 is activated, expansion material 242 undergoes a phase transformation thereby significantly increasing its length. It does this against the restraining resistance of mandrel portion 240 of D-strut 254. Thus, the material and dimensions of mandrel portion 240 and expansion material 242 should be chosen so that the expansion force of exparision material 242 plastically stretches mandrel portion 240. For this reason, TiNi is preferred for expansion material 242 and type A-286 stainless steel is preferred for mandrel portion 240. Type A-286 stainless steel has a large plastic limit, that is, it continues to plastically deform long after lesser materials might have destructively fractured. Strut 200 is released by heating expansion material 242 with heater 244 to plastically deform D-strut 254 without fracture. As with strut 100, this release is a gradual and quiet process, without the sudden snap or explosive detachment encountered in the prior art. The speed of the release step is determined generally by the heating time-constant of heater 244 and expansion material 242 mounted on D-strut 254. Electricity is supplied to heater 244 via plug 280.

Joints 231, 233, 239, 247, 263 in strut 200 may be formed by any convenient means, as for example and not intended to be limiting, mechanical threads or the like, brazing and welding or the like, or other means well known in the art having sufficient shear strength for the application. Persons of skill in the art will also understand that the assemblies depicted in connection with FIGS. 1–14 are intended to illustrate the principles of the invention and not be shop drawings. Differently shaped components and more or fewer assembly joints may be desirable to facilitate struts embodying the present invention. Further it will be appreciated that the order of assembly of parts of the struts may be varied to suit particular manufacturing needs and applications. Persons of skill in the art will know how to do this based on the description herein and the accompanying drawings.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A support strut having opposed distal ends, comprising:
a damping section coupled between the ends and having at least one gap therein when the strut is unlocked;
a locking section comprising a turnbuckle arrangement coupled between the ends for closing the at least one gap by applying stress to a portion of the damping section through a force transmitting member; and
a releasing section coupled in parallel with the force transmitting member, the releasing section comprising a shape memory alloy and heater therefore such that heating the shape memory alloy substantially relieves the stress in the force transmitting member.

2. The strut of claim 1 wherein the shape memory alloy has an approximately cylindrical shape and is substantially coaxial with the force transmitting member.

3. The strut of claim 1 wherein the locking section comprises a worm and pinion gear arrangement for applying stress to the force transmitting member.

4. The strut of claim 3 wherein the pinion gear drives a rotating and sliding sleeve having opposite pitch threads on the interior thereof.

5. The strut of claim 4 wherein the opposite pitch threads comprise a first portion with a first pitch and a second portion with opposite pitch and wherein the first portion engage a first threaded device fixed with respect to one end and the second portion engage a second threaded device moveable with respect to the one end.

6. The strut of claim 5 wherein the first and second devices are coupled so that they slide but do not rotate with respect to each other.

7. A coupling structure having a first end for attachment to a support and a second end for attachment to a load, wherein the coupling structure is adapted to be locked and released, comprising:
a locking mechanism coupling the first and second ends for generating a static force that locks the coupling structure when present and leaves the coupling structure free when substantially absent, the locking mechanism comprising a turnbuckle arrangement for applying the force;
a shape memory alloy region laterally surrounding a portion of the locking mechanism whereby a change in length of the shape memory region relieves the force generated by the locking mechanism thereby unlocking the coupling structure; and
actuating means coupled to the shape memory alloy for causing the shape memory alloy to gradually change in length when activated, so that unlocking is achieved without sudden shock or breakage.

8. The structure of claim 7 wherein the turnbuckle arrangement comprises a worm and pinion gear combination.

9. The structure of claim 7 wherein the actuating means comprises a heater coupled to the shape memory alloy so that when the heater is energized the shape memory alloy temperature is increased to cause it to elongate.

10. The structure of claim 7 wherein the shape memory alloy has an elongated cylindrical shape and is located substantially coaxially with the portion of the locking mechanism.

11. The structure of claim 7 wherein the actuating means is remotely actuatable.

12. The structure of claim 7 further comprising a spring coupling the first and second ends, the spring being compressed to a limit when the structure is locked and not compressed to the limit when the structure is unlocked.

13. A method for locking and releasing a coupling structure between a platform and a load, the coupling structure having a first end for attachment to the platform and a second end for attachment to the load, the coupling structure having a damper section coupling the first and second ends, a locking section between the damper section and one end for applying force to the damper section, the locking section comprising a turnbuckle arrangement, and a releasing section containing a shape memory alloy in parallel with a portion of the locking section, the method comprising:
applying a force to the damper section using the turnbuckle arrangement to lock the coupling structure;
heating the shape memory alloy to relieve the force applied to the damper section, thereby releasing the coupling structure.

14. The method of claim 13 wherein the heating step comprises, heating the shape memory alloy to cause the elongation thereof without fracture of a position of the coupling structure.

15. The method of claim 13 wherein the heating step comprises heating the shape memory alloy to a phase change transition.

* * * * *

UNITED STATES PATENT AND TRADEMARK OFFICE
CERTIFICATE OF CORRECTION

PATENT NO.    : 6,920,966 B2
DATED         : July 26, 2005
INVENTOR(S)   : Paul D. Buchele et al.

It is certified that error appears in the above-identified patent and that said Letters Patent is hereby corrected as shown below:

Column 1,
Line 5, should read -- The United States Government may have certain rights to this invention under government contract 01-006202-43605. --.

Signed and Sealed this

Third Day of January, 2006

JON W. DUDAS
*Director of the United States Patent and Trademark Office*